Figure 1:
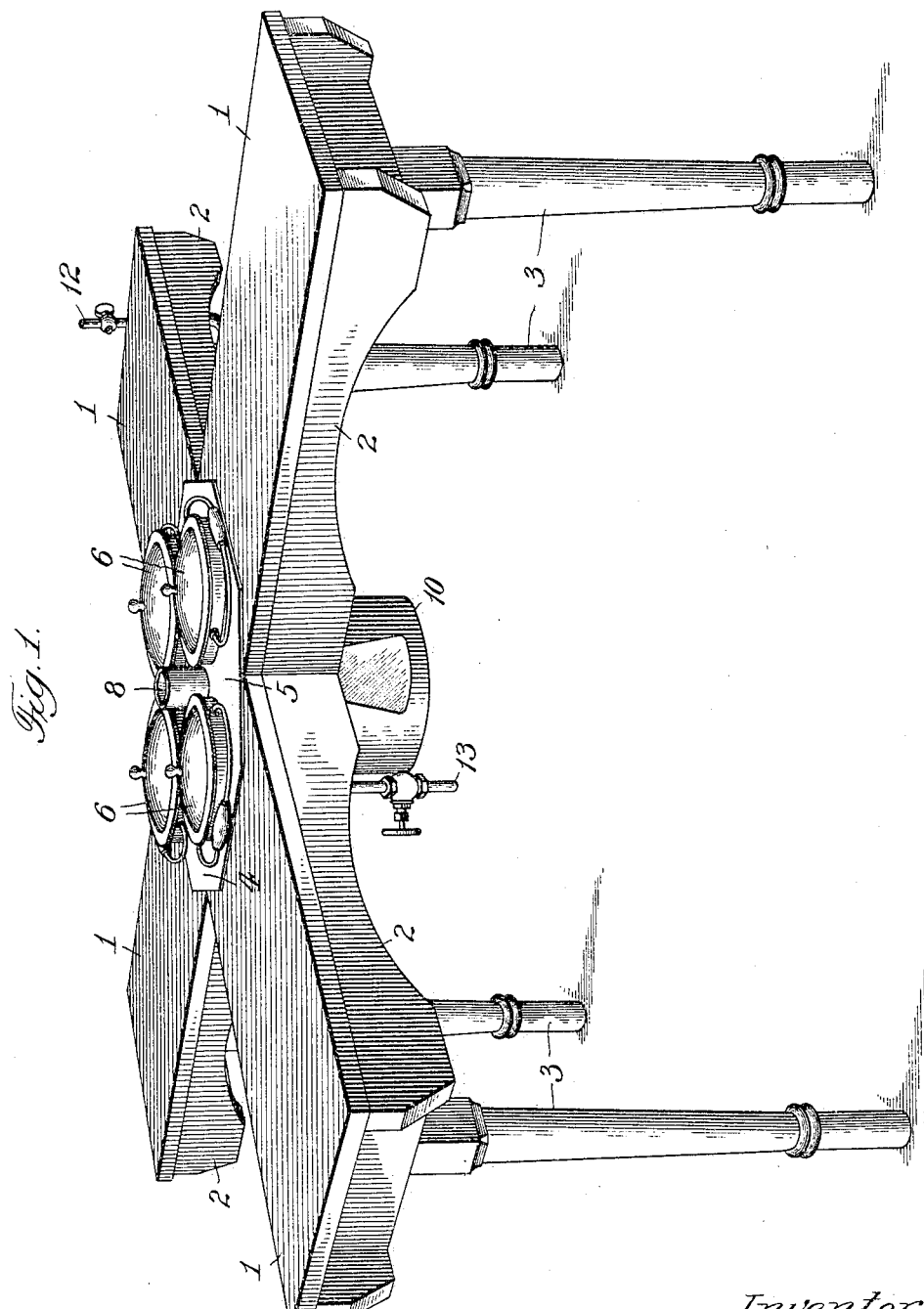

No. 793,124. PATENTED JUNE 27, 1905.
G. F. DICKSON.
CONFECTIONER'S TABLE.
APPLICATION FILED SEPT. 12, 1904.

2 SHEETS—SHEET 1.

Attest:
John Enders.
M. H. Holmes.

Inventor:
George F. Dickson,
by Robert Burns
Attorney.

No. 793,124. PATENTED JUNE 27, 1905.
G. F. DICKSON.
CONFECTIONER'S TABLE.
APPLICATION FILED SEPT. 12, 1904.
2 SHEETS—SHEET 2.
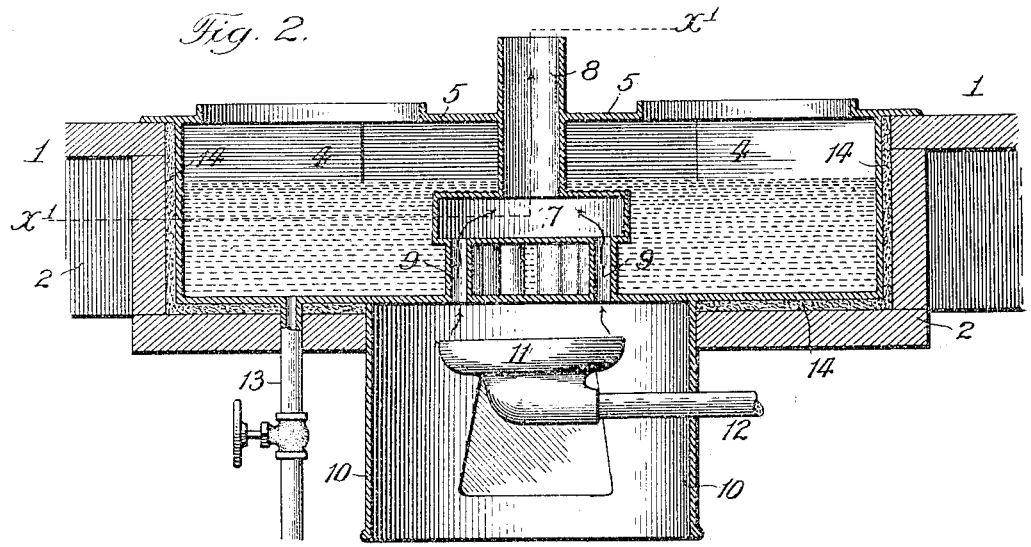
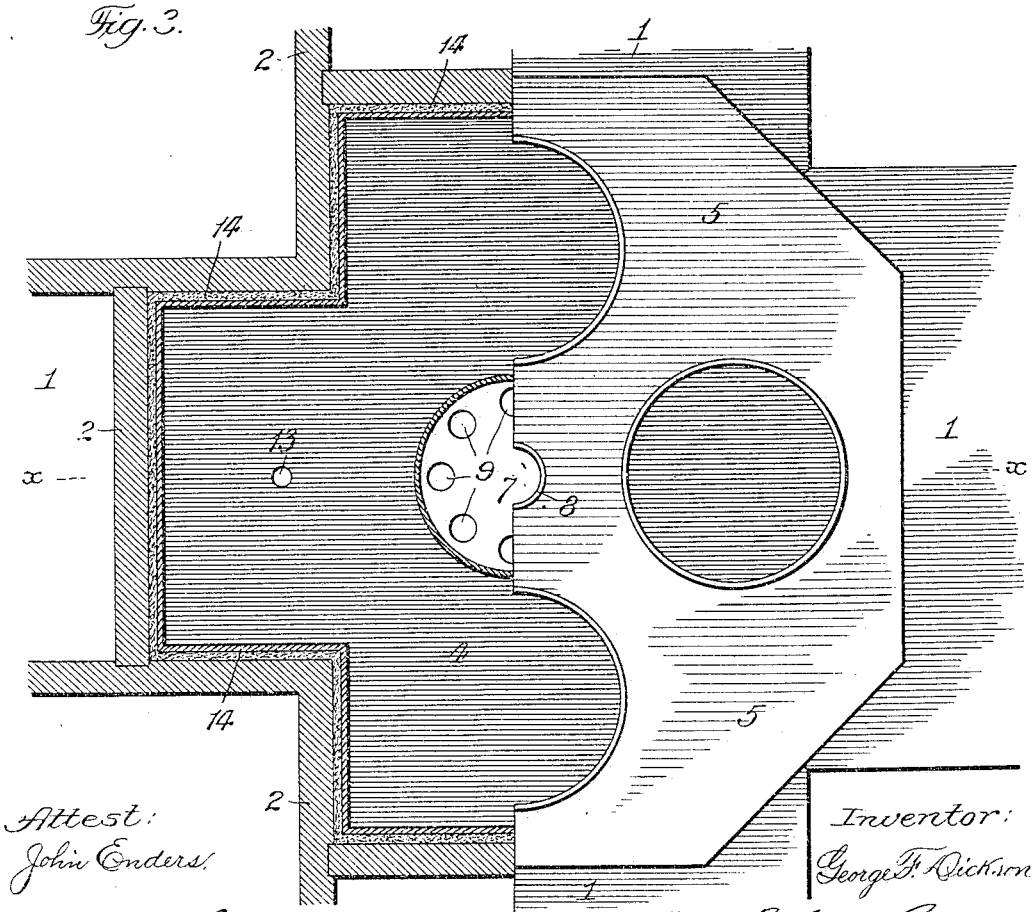

No. 793,124.     Patented June 27, 1905.

UNITED STATES PATENT OFFICE.

GEORGE F. DICKSON, OF CHICAGO, ILLINOIS, ASSIGNOR TO CONFECTIONERS AND BAKERS SUPPLY CO., A CORPORATION OF ILLINOIS.

CONFECTIONER'S TABLE.

SPECIFICATION forming part of Letters Patent No. 793,124, dated June 27, 1905.

Application filed September 12, 1904. Serial No. 224,084.

*To all whom it may concern:*

Be it known that I, GEORGE F. DICKSON, a citizen of the United States of America, and a resident of Chicago, in the county of Cook and State of Illinois, have invented certain new and useful Improvements in Confectioners' Tables, of which the following is a specification.

The present invention relates to a combined work-table and heater or melter for confectioners' and allied uses, and has for its object to provide, first, a simple and convenient form of table, and, second, an economical and efficient means for maintaining a mild and uniform heat around the melting-pot or like vessel containing the confection or other material, all as will hereinafter more fully appear and be more particularly pointed out in the claims.

In the accompanying drawings, Figure 1 is perspective view illustrating the general arrangement of parts in the present invention. Fig. 2 is a detail horizontal section at line $x\,x$, Fig. 3, of the central portion of the table. Fig. 3 is a detail vertical section of the same at line $x'\,x'$, Fig. 2.

Similar numerals of reference indicate like parts in the several views.

Referring to the drawings, 1 represents the horizontal table bed or top, carried by an underframe 2, to which are secured the usual supporting feet or legs 3. In the preferred form of the present invention, as illustrated in Fig. 1 of the drawings, the table bed or top 1 comprises a central portion and a plurality of extensions therefrom connected together in angular and symmetrical relation to form a cross-like structure and afford a series of individual working beds or surfaces for a series of workers in dipping bonbons and like confectionery or other articles. It is, however, within the scope of the present invention to either decrease the number of such extensions to three or to increase the number to five and in either case preserving a symmetrical intersecting relation of the extensions.

4 is a heating-tank located centrally at the intersection of the series of extensions of the table and adapted to contain a body of water for use in warming or melting the confectionery or other material operated upon.

5 is the top plate of the heating-tank, preferably arranged on a level with the surface of the extensions aforesaid and provided with a circular series of openings for the reception of the series of melting or warming vessels 6, which contain the supplies of confectionery or the like.

The heating-tank 4 may be kept at the required temperature by the ordinary heating-coil and in substantially the same manner as in my former patent, No. 730,748, of June 9, 1903. It is, however, preferred to employ the arrangement shown in the present drawings for effecting the heating of the water in such tank in a direct manner in such construction. 7 is a shallow cylindrical heating-drum arranged a short distance above the bottom plate of the heating-tank and provided with an outlet-pipe 8, extending up through the top plate of such heating-tank.

9 represents a series of tubes extending from the bottom head of the drum 7 down through the bottom plate of the heating-tank and in communication with a burner-chamber located beneath the heating-tank. The arrangement is such that the heated products of combustion from the burner in the burner-chamber will pass up through the series of tubes 9 into the heating-drum 7 to discharge through the outlet-tube 8 and during such passage effect a heating of the water in the heating-tank.

10 is an open bottom casing secured to the under side of the bottom plate of the heating-tank to form the burner-chamber above referred to.

11 is a gas-burner of any usual and suitable construction arranged in the burner-chamber aforesaid and immediately beneath the series of tubes 9, so that the same will receive the heated products of combustion from the burner.

12 is a supply-pipe for conducting gas to the burner 11.

13 is a valved drain-pipe for drawing off the water from the heating-tank when it is required to empty the same.

14 represents layers of asbestos or like non-conducting material inclosing the sides and bottom of the heating-tank for the purpose of reducing heat radiation therefrom.

Having thus fully described my said invention, what I claim as new, and desire to secure by Letters Patent, is—

1. In a table for confectioners and the like, comprising a central portion and a plurality of extensions therefrom connected together in angular relation, and a heating-tank arranged centrally thereof, substantially as set forth.

2. In a table for confectioners and the like, comprising a central portion and a plurality of extensions therefrom connected together in the form of a cross, and a heating-tank arranged centrally thereof substantially as set forth.

3. In a table for confectioners and the like, comprising a central portion and a plurality of extensions therefrom connected together in angular relation, and a heating-tank arranged centrally thereof and provided with a series of orifices in its top plate for the reception of a series of heating vessels, substantially as set forth.

4. In a table for confectioners and the like, comprising a central portion and a plurality of extensions therefrom connected together in the form of a cross, and a heating-tank arranged centrally thereof and provided with a series of orifices in its top plate for the reception of a series of heating vessels, substantially as set forth.

5. In a table for confectioners and the like, comprising a central portion and a plurality of extensions therefrom connected together, a heating-tank arranged centrally thereof, a heating-drum arranged in said heating-tank and provided with an outlet-tube extending up through the top plate of said heating-tank, a series of tubes extending from said drum through the bottom plate of the heating-tank, a burner-chamber arranged beneath said tubes, and a burner in said chamber, substantially as set forth.

6. In a table for confectioners and the like, comprising a central portion and a plurality of extensions therefrom connected together in angular relation, a heating-tank arranged centrally thereof, a heating-drum arranged in said tank and provided with an outlet-tube extending up through the top plate of said tank, a series of tubes extending from said drum down through the bottom plate of the heating-tank, a burner-chamber arranged beneath said tubes, and a burner in said chamber, substantially as set forth.

7. In a table for confectioners and the like, comprising a central portion and a plurality of extensions therefrom connected together in the form of a cross, a heating-tank arranged centrally thereof, a heating-drum arranged in said tank and provided with an outlet-tube extending up through the top plate of said tank, a series of tubes extending from said drum down through the bottom plate of the heating-tank, a burner-chamber arranged beneath said tubes, and a burner in said chamber, substantially as set forth.

8. In a table for confectioners and the like, comprising a central portion and a plurality of extensions therefrom connected together in angular relation, a heating-tank arranged centrally thereof and provided with a series of orifices in its top plate for the reception of a series of heating vessels, a heating-drum arranged in said tank and provided with an outlet-tube extending up through the top plate of said tank, a series of tubes extending from said drum down through the bottom plate of the heating-tank, a burner-chamber arranged beneath said tubes, and a burner in said chamber, substantially as set forth.

9. In a table for confectioners and the like, comprising a central portion and a plurality of extensions therefrom connected together in the form of a cross, a heating-tank arranged centrally thereof and provided with a series of orifices in its top plate for the reception of a series of heating vessels, a heating-drum arranged in said tank and provided with an outlet-tube extending up through the top plate of said tank, a series of tubes extending from said drum down through the bottom plate of said heating-tank, a burner-chamber arranged beneath said tubes, and a burner in said chamber, substantially as set forth.

Signed at Chicago, Illinois, this 6th day of September, 1904.

GEORGE F. DICKSON.

Witnesses:
ROBERT BURNS,
M. H. HOLMES.